UNITED STATES PATENT OFFICE.

JOHANN BAMMANN, ERNST DAVIDIS, AND WALTER VORSTER, OF ELBERFELD, GERMANY, ASSIGNORS TO THE FARBENFABRIKEN OF ELBERFELD COMPANY, OF NEW YORK, N. Y.

AZO DYESTUFF AND METHOD OF MAKING SAME.

SPECIFICATION forming part of Letters Patent No. 656,621, dated August 28, 1900.

Application filed April 4, 1900. Serial No. 11,456. (No specimens.)

*To all whom it may concern:*

Be it known that we, JOHANN BAMMANN, ERNST DAVIDIS, and WALTER VORSTER, doctors of philosophy, chemists, (assignors to the FARBENFABRIKEN OF ELBERFELD COMPANY, of New York,) residing at Elberfeld, Germany, have invented a new and useful Improvement in Azo Dyes; and we hereby declare the following to be a clear and exact description of our invention.

In the application for Letters Patent, Serial No. 5,601, a dioxydinaphthylamin disulfonic acid is described, which in a free state has the following formula:

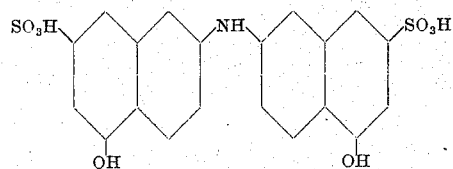

We have now found that on combining this acid with two molecules of diazo compounds a new group of valuable azo dyestuffs is obtained, which dye unmordanted cotton from red to blue bright and fast shades. The combination of the acid with the diazo compounds is profitably performed in an alkaline solution. Either the same or two different diazo compounds may be used. The new dyestuffs thus obtained are alkaline salts of an acid having the general formula—

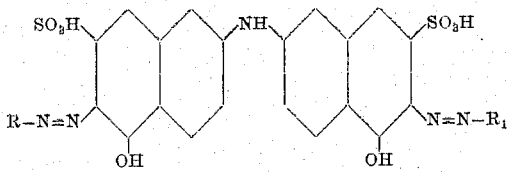

in which formula R and $R_1$ mean either the same or two different hydrocarbon radicals of the benzene or naphthalene series, such as phenyl, tolyl, naphthyl, or the like. They are dark powders having a metallic luster, which are soluble in water with a color varying from red to violet, and dye unmordanted cotton from red to blue bright and fast shades.

In carrying out our new process practically we can proceed as follows, the parts being by weight: 18.6 parts of anilin are diazotized in the usual way by means of 5.6 parts of hydrochloric acid of 19° Baumé and fourteen parts of sodium nitrite. The solution of the diazo compound thus obtained is stirred while cooling into a concentrated solution of 46.1 parts of the dioxydinaphthylamin disulfonic acid, (having the above-mentioned formula,) which is mixed with twelve parts of sodium carbonate. The reaction mass must remain alkaline throughout the whole reaction. Stirring is continued for about twelve hours until the reaction is finished. The mixture is then heated to about 80° centigrade, and the dyestuff thus produced is precipitated by means of common salt, filtered off, pressed, dried, and pulverized.

The new coloring-matter represents a brown powder of a metallic luster, soluble in water with a red color. It is the sodium salt of an acid having the formula—

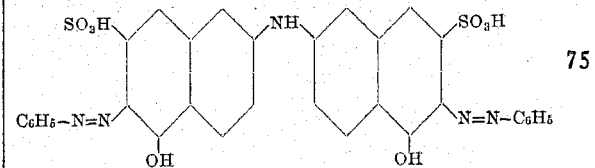

By concentrated sulfuric acid (of 60° Baumé) it is dissolved, yielding a blue solution, the color of which changes into reddish blue on the addition of a small quantity of ice, while a dark precipitate is separated therefrom on adding a larger quantity of ice. It is also soluble in ammonia, as well as in alcohol, with a red color.

The new dyestuff yields on unmordanted cotton in alkaline baths clear red fast shades.

The process proceeds in an analogous manner if instead of diazobenzene chlorid mentioned in the example the equivalent quantity of other of the above-defined dyestuff components are used.

Having now described our invention and in what manner the same is to be performed, what we claim as new, and desire to secure by Letters Patent, is—

1. The process for producing new azo dyestuffs by first combining the dioxydinaphthylamin disulfonic acid having in a free state the following formula:

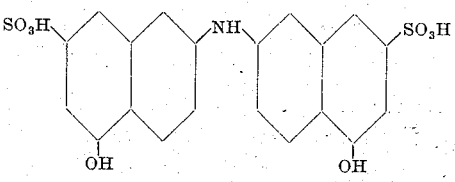

with two molecules of any diazo compound for which purpose also molecular proportions of different diazo compounds may be employed, secondly precipitating and finally isolating the dyestuffs thus produced, substantially as hereinbefore described.

2. The process for producing a new azo dyestuff by first combining two molecules of diazobenzene chlorid with one molecule of the above-defined dioxydinaphthylamin disulfonic acid, secondly precipitating and finally isolating the dyestuff thus produced, substantially as hereinbefore described.

3. As new articles of manufacture the new disazo dyestuffs, being alkaline salts of an acid having the general formula:

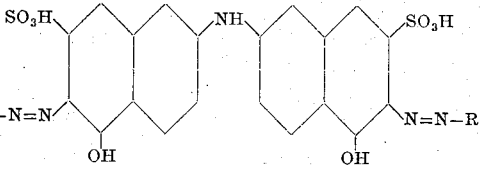

R and $R_1$ meaning any aromatic radicals, which dyestuffs are, when dry and pulverized, dark powders, soluble in water, dyeing unmordanted cotton from red to blue fast shades, substantially as hereinbefore described.

4. As a new article of manufacture the specific dyestuff being an alkaline salt of the acid having the formula:

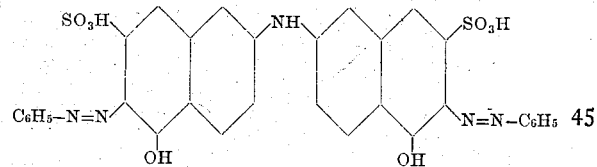

which is a brown powder of a metallic luster, soluble in water with a red color, soluble in concentrated sulfuric acid with a blue color which turns into reddish blue on adding a small quantity of ice, while a dark precipitate is obtained on the addition of a larger quantity of ice to the sulfuric-acid solution, soluble in alcohol and in ammonia with a red color, dyeing unmordanted cotton in alkaline baths clear red fast shades, substantially as hereinbefore described.

In testimony whereof we have signed our names in the presence of two subscribing witnesses.

JOHANN BAMMANN.
ERNST DAVIDIS.
WALTER VORSTER.

Witnesses:
OTTO KÖNIG,
J. A. RITTERSHAUS.